United States Patent
Ohgaki

Patent Number: 5,939,999
Date of Patent: *Aug. 17, 1999

[54] POLLING METHOD AND APPARATUS FOR A DIGITAL PROCESSING SYSTEM

[75] Inventor: Hiroyuki Ohgaki, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/617,176

[22] Filed: Mar. 18, 1996

[30] Foreign Application Priority Data

Mar. 17, 1995 [JP] Japan ................................. 7-059005

[51] Int. Cl.⁶ .................................................. G05B 23/00
[52] U.S. Cl. .................... 340/825.08; 370/449; 370/346; 395/839; 395/289; 395/837; 395/727
[58] Field of Search .................... 340/825.08, 825.22; 370/216, 449; 395/839, 289, 835, 837, 866, 290, 287, 727; 364/241, 940.1, 940.6; 711/154, 156, 370, 379

[56] References Cited

U.S. PATENT DOCUMENTS

| | | |
|---|---|---|
| 3,652,993 | 3/1972 | Bridwell et al. ............... 340/825.08 X |
| 4,144,583 | 3/1979 | Lawson et al. .................. 364/940.1 X |
| 4,225,917 | 9/1980 | Hepworth et al. .................. 364/241 X |
| 4,683,531 | 7/1987 | Kelch et al. .................... 340/825.22 X |
| 4,807,116 | 2/1989 | Katzman et al. . |
| 4,888,684 | 12/1989 | Lilja et al. . |
| 4,972,184 | 11/1990 | Go et al. ........................ 340/825.08 X |
| 5,319,785 | 6/1994 | Thaller ................................. 395/835 |
| 5,347,515 | 9/1994 | Marino ........................... 340/825.08 X |
| 5,434,861 | 7/1995 | Pritty et al. .................... 340/825.08 X |
| 5,463,752 | 10/1995 | Benhase et al. ...................... 395/481 X |
| 5,471,618 | 11/1995 | Isfeld ............................ 340/825.08 X |
| 5,479,406 | 12/1995 | Matsutani ........................... 340/825.08 |

Primary Examiner—Brian Zimmerman
Assistant Examiner—William H. Wilson, Jr.
Attorney, Agent, or Firm—Helfgott & Karas, P.C.

[57] ABSTRACT

A polling method and apparatus for polling from a control unit to a plurality of controlled units using an information collecting command in order to collect status information from each controlled unit in a digital processing system by continuously monitoring the status of the controlled units. The apparatus determines, in the control unit, whether there is any one of the controlled units which is not mounted or has failed. Status information is returned from each controlled unit to the control unit when the control unit determines a normal state of the controlled unit. Response information is returned from the controlled unit to the control unit instead of the status information when the control unit determines an abnormal state of the controlled unit.

7 Claims, 11 Drawing Sheets

POLLING METHOD AND APPARATUS FOR A DIGITAL PROCESSING SYSTEM

BACKGROUND OF THE INVENTION

1. Field of the Invention

The present invention relates to a polling method and apparatus for a digital processing system. Particularly, it relates to a method for polling through an information collecting command transmitted from a control unit to a plurality of controlled units in order to collect status information from each controlled unit, and a polling apparatus for realizing the polling method in a digital processing system, particularly, a transmission apparatus in a digital communication system.

2. Description of the Related Art

In general, a transmission apparatus used in a digital communication system is formed by a supervisory control unit and a plurality of controlled units, and each controlled unit performs various processes, for example, switching control of redundancy portion, setting of status, collection of alarm signals, etc.. In order to perform these processes, it is necessary to perform polling operation from the supervisory control unit to each controlled unit by using a command from the control unit to each controlled unit and using status information from the controlled unit to the control unit.

In the above polling operation, it is always required to reduce polling time between the control unit and a plurality of controlled units, even if any one of controlled units is not mounted or has failed, or the controlled unit is normal, but an internal circuit thereof has failed.

SUMMARY OF THE INVENTION

The object of the present invention is to provide a polling method and apparatus enabling a considerable reduction of polling time between a control unit and a plurality of controlled units.

In accordance with one aspect of the present invention, there is provided a polling method for polling from a control unit to a plurality of controlled units using an information collecting command in order to collect status information from each controlled unit in a digital processing system, the method including the steps of; determining in the control unit as to whether there is any one of controlled units which is not mounted or has failed; returning the status information from each of controlled units to the control unit when the control unit determines normal state of the controlled unit; and returning a response information from the controlled unit to the control unit instead of the status information when the control unit determines abnormal state of the controlled unit.

In accordance with another aspect of the present invention, there is provided a polling apparatus for polling from a control unit to a plurality of controlled units using an information collecting command in order to collect status information from each controlled unit in a digital processing system, the apparatus including; a detecting unit connected to the controlled unit for detecting whether any one of controlled units is not mounted or has failed, and outputting a selecting signal in order to select a response data from a storage unit when any one of the controlled units 2 is not mounted or has failed; the storage unit for storing the response data which is output therefrom in the abnormal state; and a selecting unit connected to the storage unit and the controlled unit for selectively outputting either the status information or the response data to the control unit in response to the selecting signal from the detecting unit.

DESCRIPTION OF THE PREFERRED EMBODIMENTS

Before describing preferred embodiments of the present invention, a conventional art and its problem will be explained, in detail, with reference to FIGS. 1 and 2.

Figure 1:
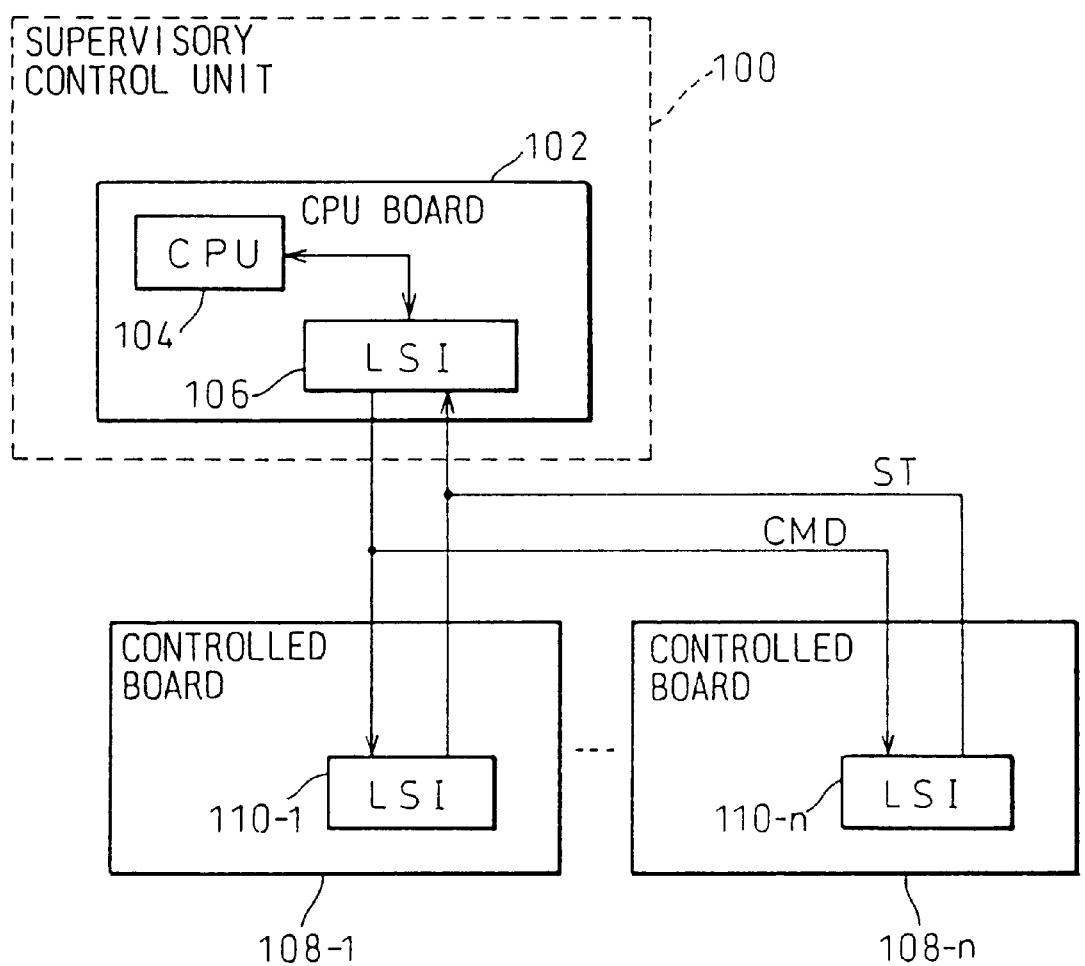
FIG. 1 is an explanatory view for explaining a polling method in a conventional transmission apparatus.

FIG. 1 is an explanatory view for explaining a polling method in a conventional transmission apparatus.

As shown in FIG. 1, a transmission apparatus is formed by a supervisory control unit 100 and a plurality of controlled boards 108-1 to 108-n which are connected in parallel with the supervisory control unit 100.

The supervisory control unit 100 includes a CPU (central processing unit) board 102 having a CPU 104 and an LSI (large scale integrated circuit) 106 for communication. Each of controlled board 108-1 to 108-n includes an LSI 110 for communication (110-1 to 110-n).

The CPU 104 communicates with each controlled board (package) 108-1 to 108-n through the LSI 106 using an information collecting command (CMD) regardless of whether at least one of controlled units is not mounted or has failed in operation, collects status information ST from each controlled board 108-1 to 108-n, and analyzes the status information ST in order to detect the status of the controlled unit. As a result of analysis, the CPU 104 performs preferable processes, for example, switching control for a redundancy portion of the controlled unit, or setting communication to the controlled unit, etc., to one of controlled boards 108-1 to 108-n.

In general, many controlled boards, for example, one hundred twenty to one hundred fifty, are provided in a transmission apparatus. In this case, the number of controlled boards is different in accordance with the kind of transmission apparatus.

As explained above, in a conventional polling method, the CPU 104 transmits the information collecting command at a certain period to all controlled boards 108-1 to 108-n regardless of whether any one of the controlled units is not mounted or has failed, receives the status information from all controlled boards 108-1 to 108-n, and determines the process for each controlled board.

Figures 2A, 2B:
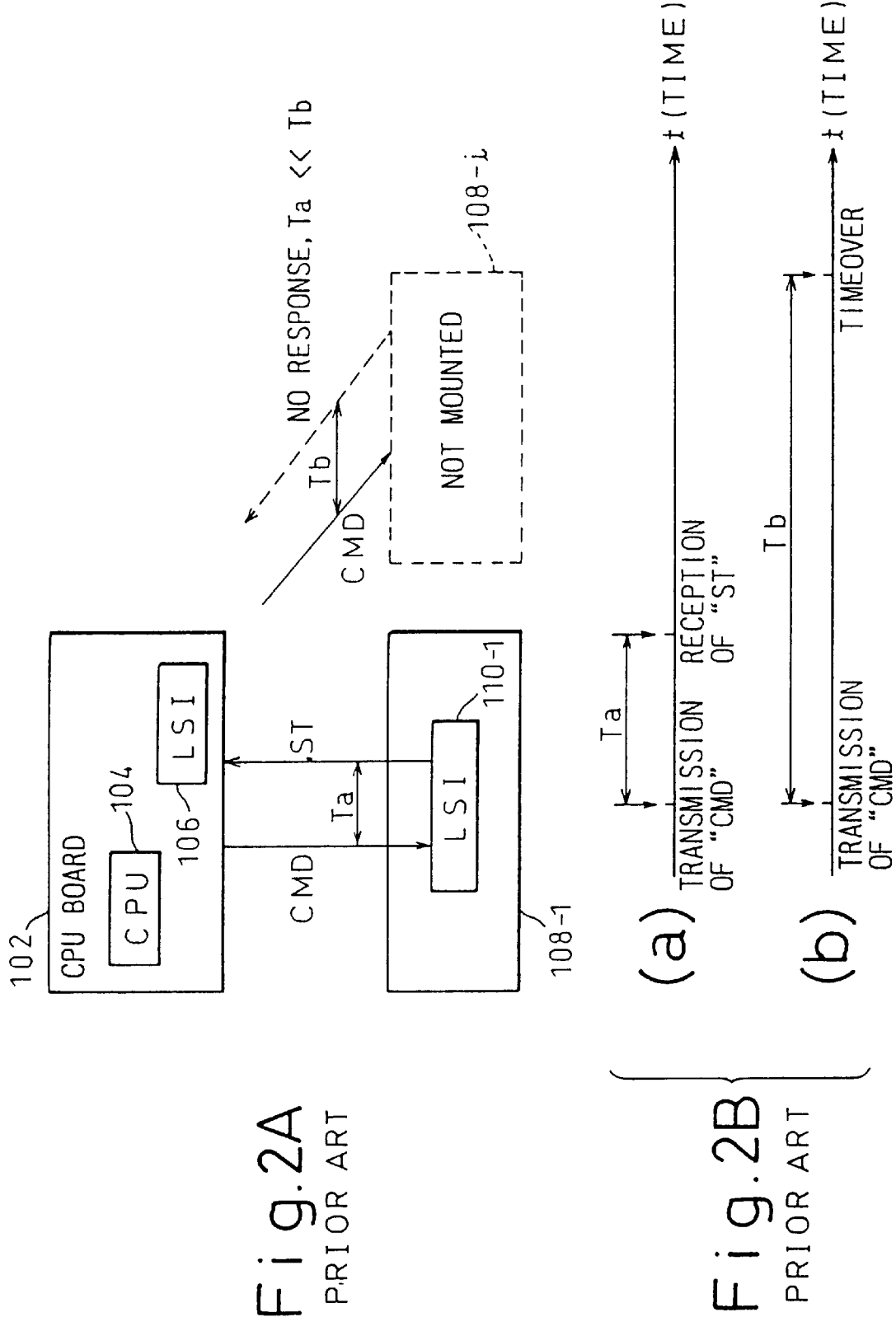
FIGS. 2A and 2B are explanatory views for explaining problem of the above conventional method.

FIGS. 2A and 2B are explanatory views for explaining the problems of the above conventional method. In the above conventional polling method shown in FIG. 2A, for example, (a) is the case that the controlled board 108-1 is mounted and the LSI 110-1 therein is normal, and (b) (shown by dotted line) is the case that the controlled board 108-i is not mounted or the LSI 110-i therein is abnormal.

In FIG. 2B, in the case (a), "Ta" is a polling time from transmission of the information collecting command CMD until reception of the status information ST in the CPU. In the case (b), "Tb" is the polling time from transmission of the information collecting command CMD until a decision of no-response (i.e., decision of timeout in the CPU 104).

As is obvious from above time charts (a) and (b), there is a large difference between the polling time Ta and polling time Tb. That is, a lot of polling time is required in the case (b) when one controlled board 108-i is not mounted or the LSI 110-i is abnormal.

The present invention will be explained in detail with reference to FIGS. 3 to 18 below.

Figure 3:
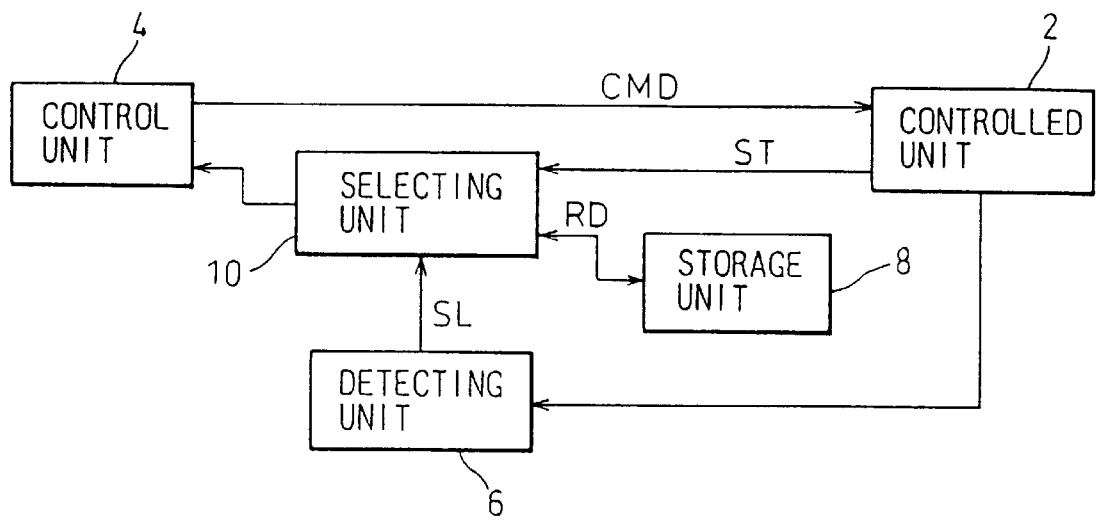
FIG. 3 is a first basic block diagram according to the present invention.
Figure 4:
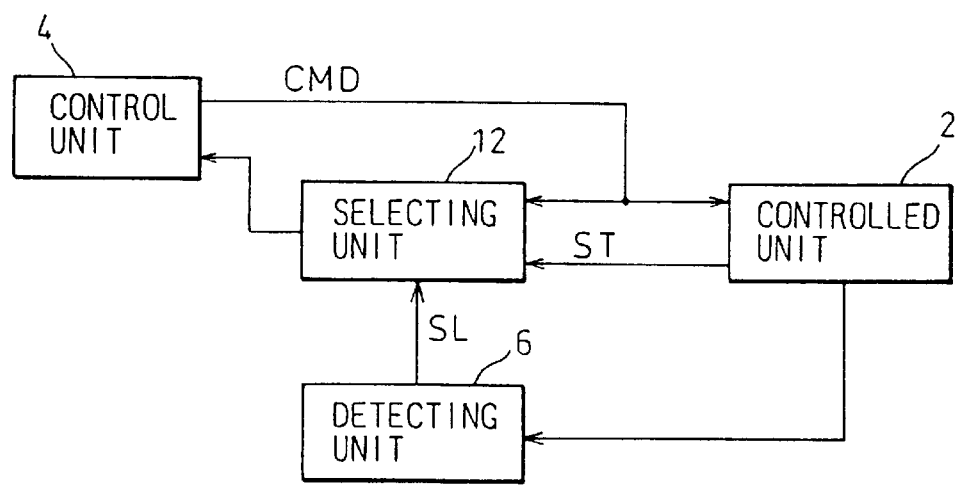
FIG. 4 is a second basic block diagram according to the present invention.
Figure 5:
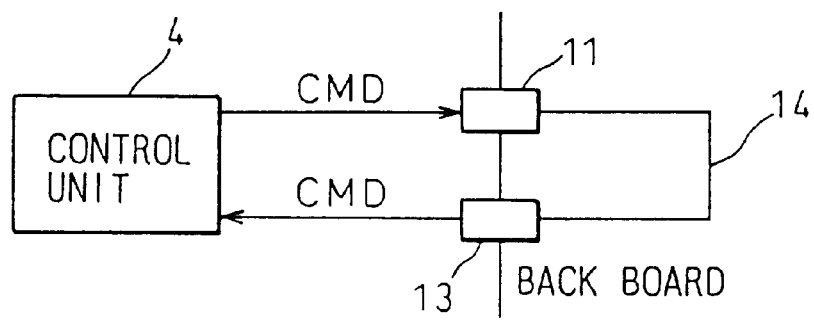
FIG. 5 is a third basic block diagram according to the present invention.
Figure 6:
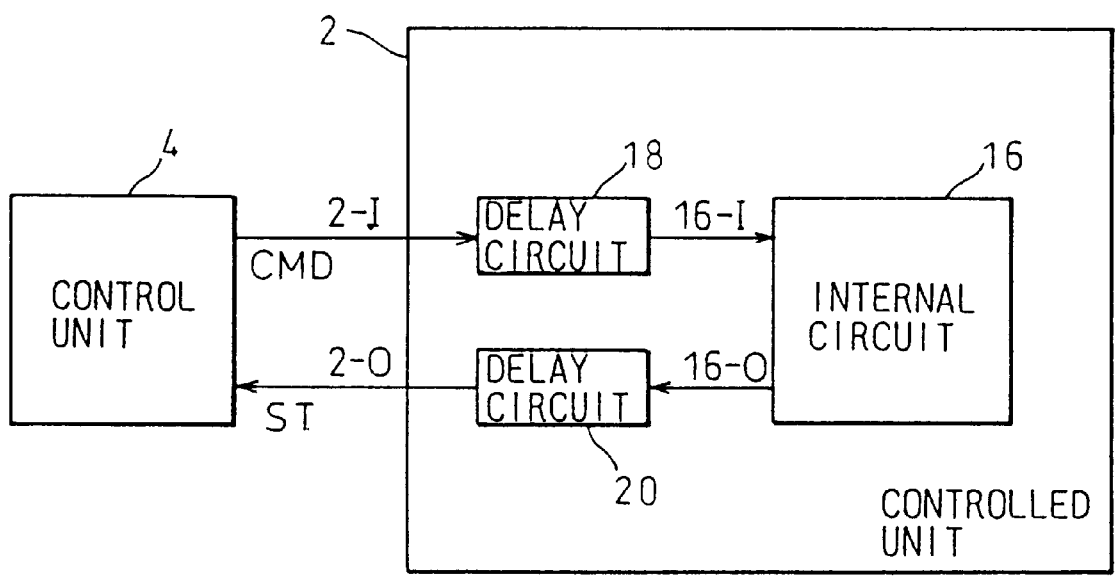
FIG. 6 is a fourth basic block diagram according to the present invention.
Figure 7:
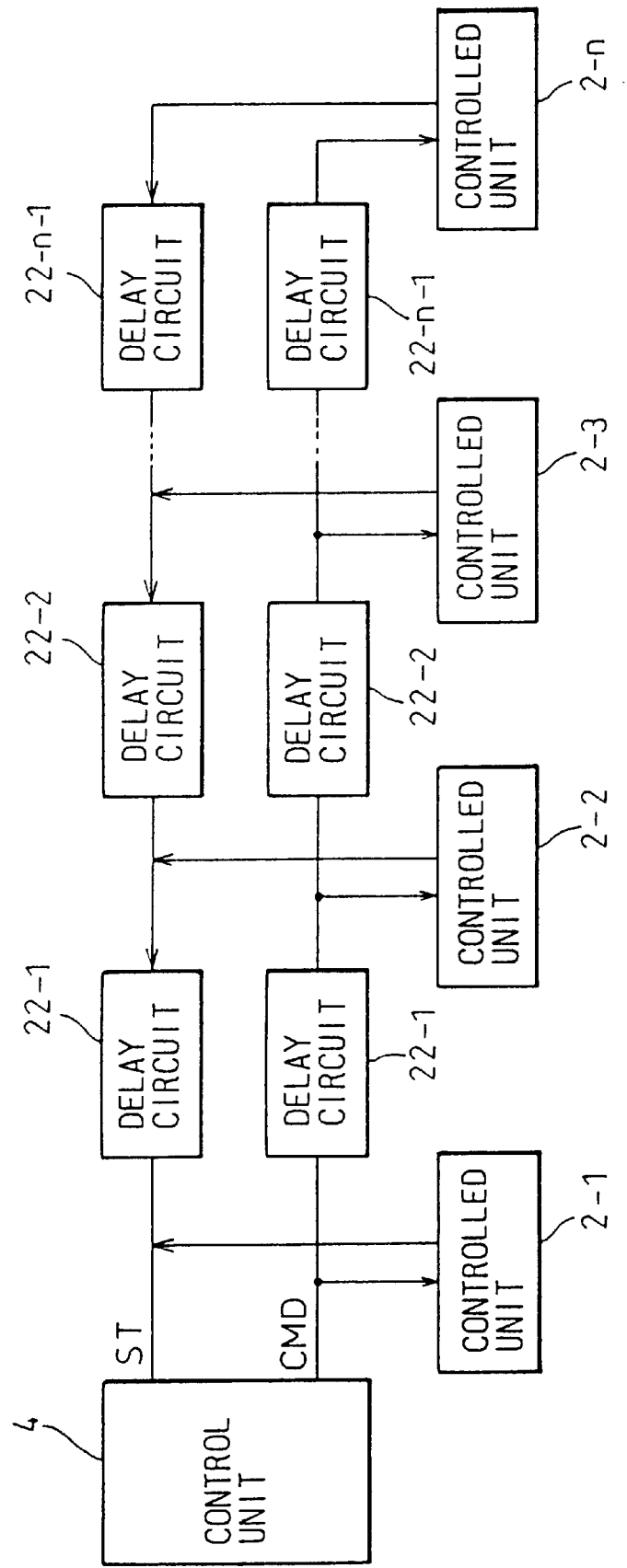
FIG. 7 is a fifth basic block diagram according to the present invention.

FIG. 3 is a first basic block diagram according to the present invention corresponding to claim 1, FIG. 4 is a second basic block diagram according to the present invention corresponding to claim 3, FIG. 5 is a third basic block diagram according to the present invention corresponding to claim 2, FIG. 6 is a fourth basic block diagram according to the present invention corresponding to claims 4 and 5, and FIG. 7 is a fifth basic block diagram according to the present invention corresponding to claims 6 and 7.

According to the invention defined in claim 1, when collecting the status information from a plurality of controlled units, in the polling method for polling from the control unit to each of controlled units using the information collecting command in the digital processing system, the control unit determines whether there is a controlled unit which is not mounted or has failed. When all controlled units are normal, the status information is returned from each of controlled units to the control unit. When any one of controlled units is abnormal, that controlled unit returns a response information to the control unit instead of the status information.

Accordingly, when all controlled units are mounted and have not failed, the status information is always returned from the controlled unit to the control unit in response to the information collecting command. When any one of controlled units is not mounted or has failed, the response information is returned from that controlled unit to the control unit. As a result, in the control unit, it is not necessary to wait for the status information for long time until a timeout is detected so that it is possible to considerably reduce the polling time.

According to the invention, the response information is given by response data which is previously provided and used at an abnormal state.

According to the invention, the response information is given by the information collecting command.

In these cases, it is possible to obtain the same effect as above described.

According to the invention, when collecting the status information from a plurality of controlled units, in the polling method for polling from the control unit to each controlled unit in the digital processing system, the control unit transmits one information collecting command to all controlled units. When receiving the information collecting command in each controlled unit, the controlled unit applies a predetermined amount of delay to the information collecting command which is transmitted from the control unit, or the status information which is returned from the controlled unit, so as not to cause competition between the status information returned from each controlled unit to the control unit.

According to this structure, it is possible to reduce the polling time since the information collecting command is sequentially transmitted to each controlled unit in accordance with a predetermined amount of delay although the information collecting commands are transmitted one by one to each controlled unit after reception of the status information in the conventional art.

According to the invention, an amount of delay is sequentially set to each of controlled units so as to become longer corresponding to a proper fraction larger than a half of the time taken when the status information is returned from the controlled unit to the control unit in response to the information collecting command during normal polling.

According to the invention, the amount of delay is sequentially delayed so as to become longer corresponding to the proper fraction larger than a half of the time taken when the status information is returned from the controlled unit to the control unit in response to the information collecting command at the normal polling.

According to this structure, as mentioned above, it is possible to reduce the polling time since the information collecting commands are not transmitted one by one for each controlled unit.

According to the invention defined in claim 1, as shown in FIG. 3, when collecting the status information from a plurality of controlled units 2, in the polling apparatus for polling from the control unit 4 to each controlled unit 2 using the information collecting command, the following units are provided between the control unit 4 and each controlled unit 2.

That is, the polling apparatus includes a detecting unit 6 connected to the controlled unit 2 for detecting whether any one of controlled unit 2 is not mounted or has failed, and outputting a selecting signal SL to select a response data RD from a storage unit 8 when any one of controlled unit 2 is not mounted or has failed; the storage unit 8 for storing the response data RD which is output in an abnormal state; and a selecting unit 10 connected to the storage unit 8 and the controlled unit 2 for selectively outputting either the status information ST or the response data RD to the control unit 4 in response to the selecting signal SL from the detecting unit 6.

According to this structure, it is possible to obtain the same effect as above described.

According to the invention, as shown in FIG. 4, when collecting the status information from a plurality of controlled units 2, in the polling apparatus for polling from the control unit 4 to each controlled unit 2 using the information collecting command, the following units are provided between the control unit 4 and each of controlled units 2.

That is, the polling apparatus includes a detecting unit 6 connected to the controlled unit 2 for detecting whether any one of controlled unit 2 is not mounted or has failed, and outputting a selecting signal SL when any one of controlled unit 2 is not mounted or has failed; and a selecting unit 12 connected to the control unit 4 and the controlled unit 2 for outputting either the information collecting command CMD or the status information ST to the control unit 4 in response to the selecting signal SL from the detecting unit 6. In this case, when the controlled unit 2 is not mounted or has failed, the information collecting command CMD is returned to the control unit 4 through the selecting unit 12 instead of the status information ST. As is obvious, in this structure, the storage unit 8 of FIG. 3 is not provided and the response data indicating the abnormal state is not used.

According to this structure, it is possible to obtain the same effect as above described.

According to the invention, as shown in FIG. 5, when collecting the status information ST from a plurality of controlled units 2, in the polling apparatus for polling from the control unit 4 to each controlled unit 2 using the information collecting command CMD, a connecting unit 14 is provided between an information collecting command pin 11 and a status information pin 13. These pins 11 and 13 are provided in a back plane to which the controlled unit is mounted, and are shorted by the connecting unit 14. Accordingly, the information collecting command CMD is returned to the control unit 4 through the connecting unit 14 and the pin 13.

According to the invention, as shown in FIG. 6, when collecting the status information from a plurality of controlled units 2, in the polling apparatus for polling from the control unit 4 to each controlled unit 2 using the information collecting command, the controlled unit 2 includes a first delay circuit 18, a second delay circuit 20 and an internal circuit 16.

The first delay circuit 18 is connected between an input terminal 2-I for receiving the information collecting command CMD and an input terminal 16-I for receiving the delayed information collecting command in the internal circuit 16. Further, the second delay circuit 20 is connected between an output terminal 16-0 for outputting the status information from the internal circuit 16 and an output terminal 2-0 for outputting the delayed status information. Each amount of delay in the first and second delay circuits 18 and 20 is set to a value so as not to cause competition in the control unit 4.

According to this structure, it is possible to obtain the same effect as above described.

According to the invention defined, as shown in FIG. 6, in the polling apparatus, the amount of delay in each of the first and second circuits 18 and 20 is sequentially set to a time longer than a half of the time (Ta/2) (a proper fraction larger than Ta/2, i.e., >Ta/2, is used). When the status information ST is returned to the control unit in response to the information collecting command CMD in the normal polling, as explained above, "Ta" is the polling time between the control unit and the controlled unit in the normal state as shown in FIG. 2B (a).

According to this structure, it is possible to obtain the same effect as above described.

According to the invention, as shown in FIG. 7, when collecting the status information from a plurality of controlled units 2, in the polling apparatus for polling from the control unit 4 to each controlled unit 2 using the information collecting command, a plurality of delay circuits 22-1 to 22-n-1 each having the same amount of delay are connected in series, and each of controlled units 2-2 to 2-n is connected between adjacent delay circuits except for the first controlled unit 2-1. In this case, the sum of the amount of delay from the control unit 4 to the predetermined controlled unit 2-i is set to the value so as not to cause competition in the control unit 4.

For example, the controlled unit 2-3 receives the information collecting command CMD delayed by the delay circuits 22-1 and 22-2, and the control unit 4 receives the status information ST delayed by the delay circuits 22-2 and 22-1.

According to this structure, it is possible to obtain the same effect as above described.

According to the invention, as shown in FIG. 7, in the polling apparatus defined in claim 12, the amount of delay in delay circuits 22-1 to 22-n is set to a longer time corresponding to the proper fraction larger than a half of the time (Ta/2) taken when the status information ST is returned to the control unit in response to the information collecting command CMD in the normal polling.

According to this structure, it is possible to obtain the same effect as above described.

Various preferred embodiments will be explained in detail with respect to FIGS. 8 to 18 below.

Figure 8:
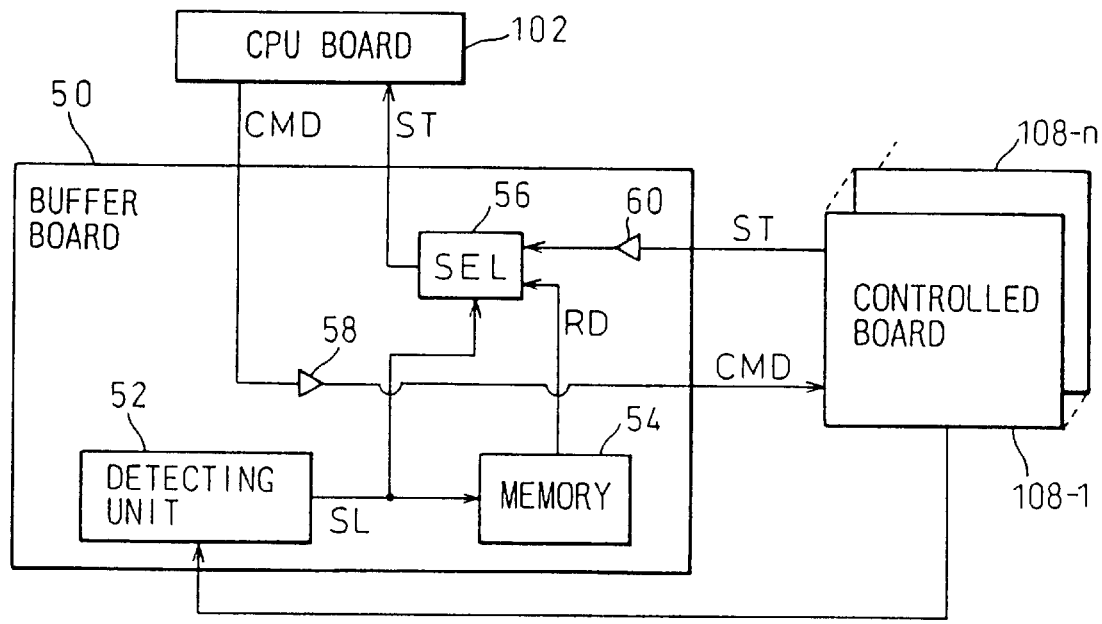
FIG. 8 shows one embodiment of the present invention.

FIG. 8 shows one embodiment of the present invention wherein reference number 50 denotes a buffer board which is provided for each controlled board. A plurality of buffer boards (or "packages") 50 are provided for each shelf of a package mounting rack (not shown).

The buffer board 50 includes a mounting and failure detecting unit 52; a storage 52 for storing the response data RD indicating the abnormal polling; and a selector 56 for selecting the response data RD when any one of controlled unit is not mounted or has failed. Further, the buffer board 50 includes drivers 58 and 60. In this case, the storage 54 may be provided in common for all controlled units in the shelf of the package mounting rack. Since the other components are the same as those of FIG. 1, the same reference numbers used in FIG. 1 are attached to the same components in FIGS. 8 and 9.

In FIG. 8, the controlled boards 108-1 to 108-n correspond to the controlled unit 2 of FIG. 3, and the CPU board 102 corresponds to the control board 4 of FIG. 3. Further, the mounting and failure detecting unit 52 corresponds to the detecting unit 6 in FIG. 3, and the storage 54 corresponds to the storage unit 8 of FIG. 3. Still further, the selector 56 corresponds to the selecting unit 10 of FIG. 3.

The information collecting command CMD which is transmitted from the CPU board 102 is applied to each of controlled boards 108-1 to 108-n through the driver 58 regardless of whether the controlled board 108 is not mounted or has failed.

When the mounting and failure detecting unit 52 outputs the selecting signal SL which does not indicate that any of controlled units 108-1 to 108-n is not mounted or has failed, the status information ST for the response to the information collecting command CMD is applied to the CPU board 102 through the driver 60 and the selector 56.

When the mounting and failure detecting unit 52 outputs the selecting signal SL which indicates that one of controlled units 108-1 to 108-n is not mounted or has failed, the selector 56 is switched to the storage 54 in response to the selecting signal SL, and the response data RD indicating the normal polling which is stored in the storage 54 is applied to the CPU board 102 instead of the status information ST in response to the information collecting command CMD.

Figure 11:
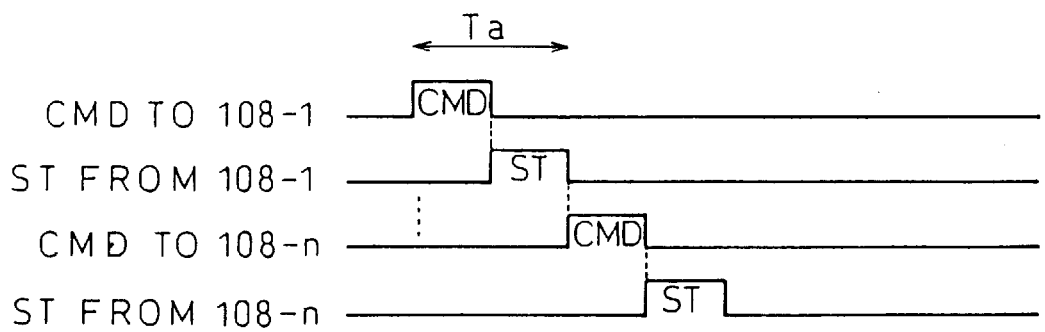
FIG. 11 is a signal timing chart at embodiments of FIGS. 6, 7 and 8.

Accordingly, in the CPU 102, it is possible to avoid a long waiting time for polling even if one or more controlled boards 108-1 to 108-n are not mounted or have failed. As a result, it is possible to reduce the polling time between the control board and the controlled boards. As shown in FIG. 11, when the number of controlled boards is "n", total polling times in the normal polling are given by Ta×n. Where, "Ta" is the time from when the information collecting command CMD is transmitted from the CPU board 102 to the controlled unit 108 until the status information ST is returned from the controlled unit 108 to the CPU board 102 in normal polling.

Figure 9:
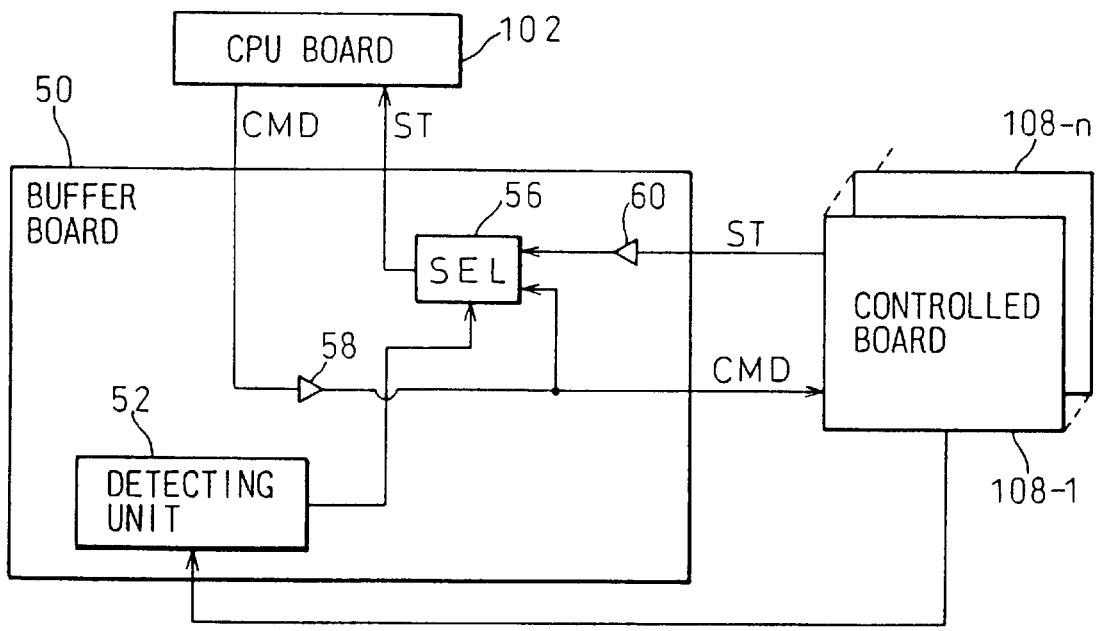
FIG. 9 shows another embodiment of the present invention.

FIG. 9 shows another embodiment of the present invention wherein the storage 54 of FIG. 8 is not provided. The information collecting command CMD is used instead of the response data which is stored in the storage 54 of FIG. 8. That is, the information collecting command CMD, which is applied from the CPU board 102 to the controlled boards 108-1 to 108-n through the driver 58, is returned to the CPU board 102 instead of the status information ST which is not returned from the controlled board 108 which is not mounted or has failed.

According to this structure, the same effect as explained in FIG. 8 can be obtained in this embodiment.

In FIG. 9, the controlled boards 108-1 to 108-n correspond to the controlled unit 2 of FIG. 4, and the CPU board 102 corresponds to the control unit 4 of FIG. 4. The mounting and failure detecting unit 52 corresponds to the detecting unit 6 of FIG. 4, and the selector 56 corresponds to the selecting unit 6 of FIG. 4.

Figure 10A:
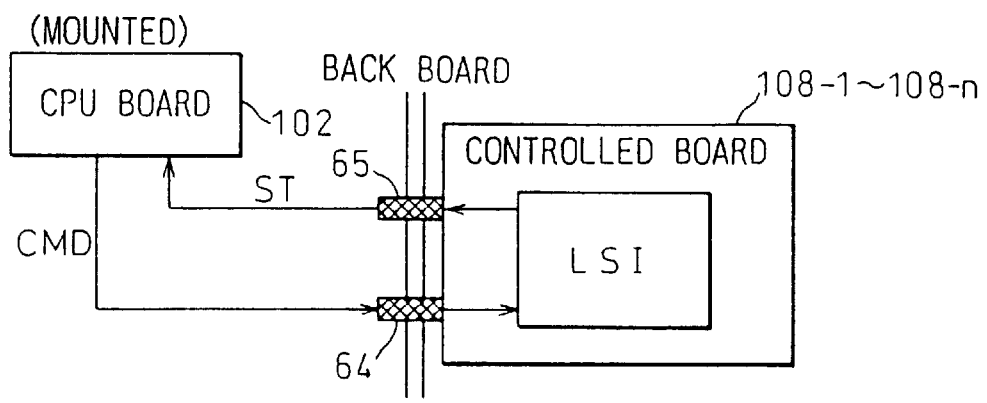
FIGS. 10A and 10B show still another embodiment of the present invention.
Figure 10B:
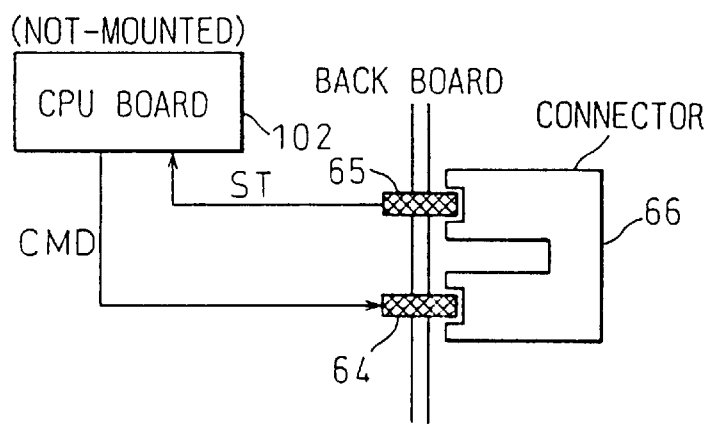

FIGS. 10A and 10B show still another embodiment of the present invention wherein when any one of controlled boards is not mounted, a connector 66 is mounted (inserted) into the information collecting command pin 64 and the status information pin 65 provided in the backboard 62 which is not mounted. Accordingly, the same effect as explained in FIGS. 8 and 9 can be obtained in this embodiment.

In FIGS. 10A and 10B, the CPU board 102 corresponds to the control unit 4 of FIG. 5, the information collecting command pin 64 corresponds to the information collecting command pin 11 of FIG. 5, and the status information pin 65 corresponds to the status information pin 13 of FIG. 5.

FIG. 11 is a signal timing chart of the embodiments of FIGS. 6, 7 and 8. In FIG. 11, the information collecting command CMD is transmitted to the controlled board 108-1, and the status information ST is returned from the controlled board 108-1 as shown by the polling time Ta.

Figure 12:
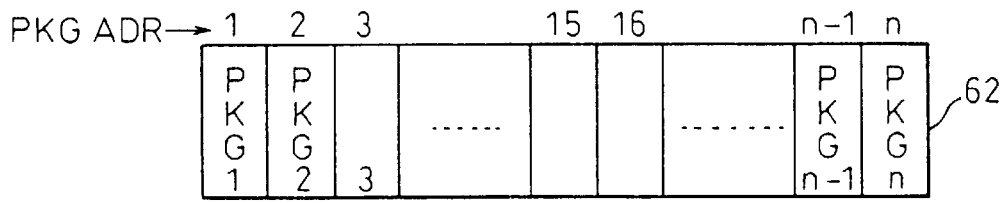
FIG. 12 shows the relationship between a package in a controlled board and package address.

FIG. 12 shows the relationship between the package in the controlled board and the package address (PKGADR). As shown in FIG. 12, the package PKG-1 has the package address PKGADR-1, the package PKG-2 has the package address PKGADR-2, and the package PKG-n has the package address PKGADR-n.

Figure 13:
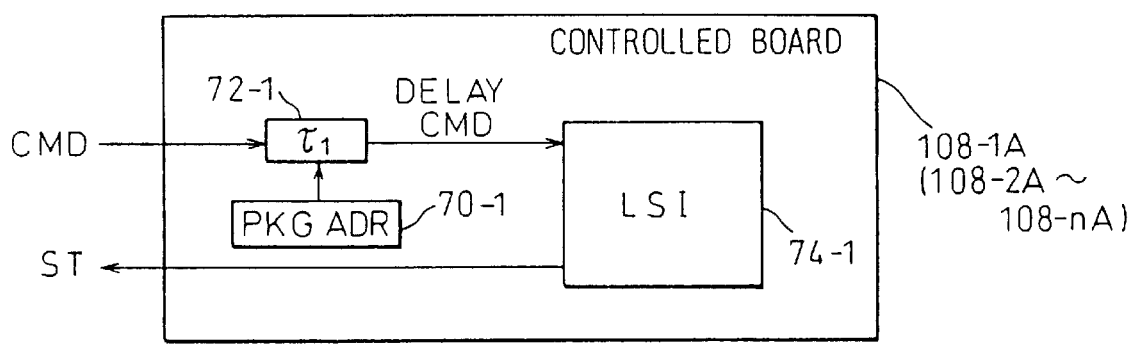
FIG. 13 shows still another embodiment of the present invention.

FIG. 13 shows still another embodiment of the present invention wherein the information collecting command CMD is applied to the communication LSI 74-1 to 74-n (only 74-1 is shown in the drawing) in the controlled boards 108-1A to 108-nA through the delay units 72-1 to 72-n (only 72-1 is shown in the drawing). The PKGADR 70-1 denotes the package address register.

Figure 16:
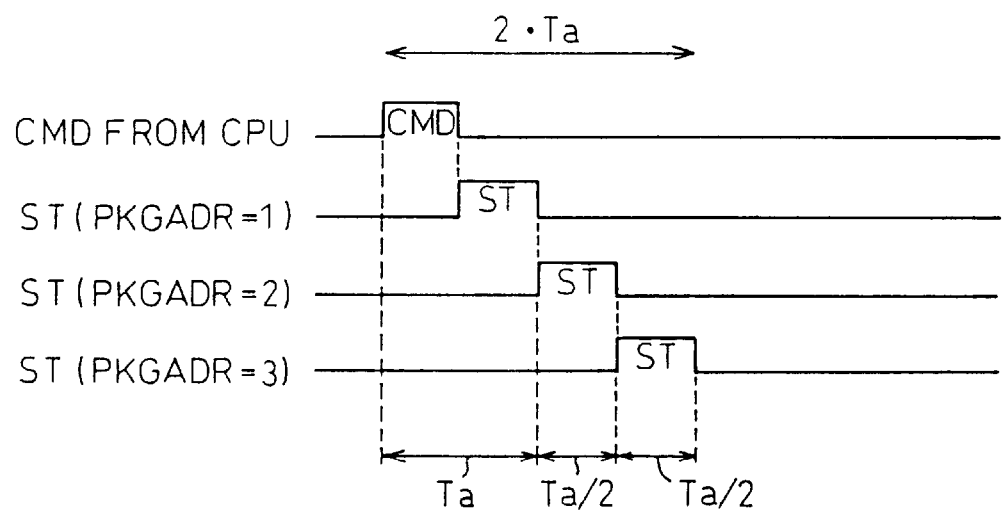
FIG. 16 shows a signal timing chart for the embodiments of FIGS. 13, 14 and 15.

Each of delay units 72-1 to 72-n is formed so as to have an amount of delay in accordance with the value of the package address register PKGADR. That is, when the PKGADR=1, the delay time $\tau_1=0$, when the PKGADR=2, $\tau_1=(\frac{1}{2})$Ta, when PKGADR=3, $\tau_1=$Ta, . . . , and when PKGADR=n, $\tau_1=(n-\frac{1}{2})$Ta. Where, "Ta" is given by the time from when the information collecting command CMD is transmitted from the CPU board 102 until the status information ST is returned to the CPU board 102 in the normal polling. When the delay time $\tau_1$ is determined as mentioned above, the timing chart of the above polling operation is shown in FIG. 16.

Accordingly, when the number of controlled boards is "n", the polling time required for polling the controlled boards becomes (n+1)Ta/2 so that it is possible to reduce the total polling time.

Figure 14:
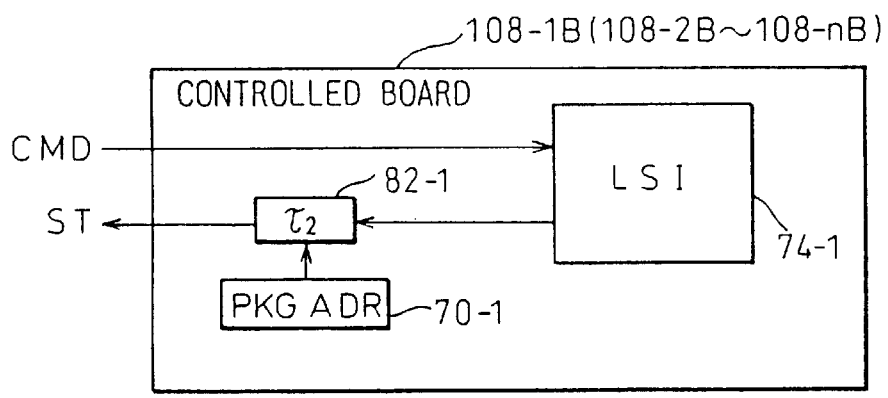
FIG. 14 shows still another embodiment of the present invention.

FIG. 14 shows still another embodiment of the present invention wherein the delay is applied to the status information ST. In FIG. 14, PKGADR 70-1 shows the package address register as well as that of FIG. 13, reference number 82-1 denotes the delay circuit (only one delay circuit is shown). The delay time $\tau_2$ is the same delay time as shown in FIG. 13. The package address register PKGADR 70-1 and the delay circuit 82-1 are provided in the controlled board 108-1B, and other package address registers and delay circuits, which are provided in the controlled boards 108-2B to 108-nB, are not shown in this drawing.

Figure 15:
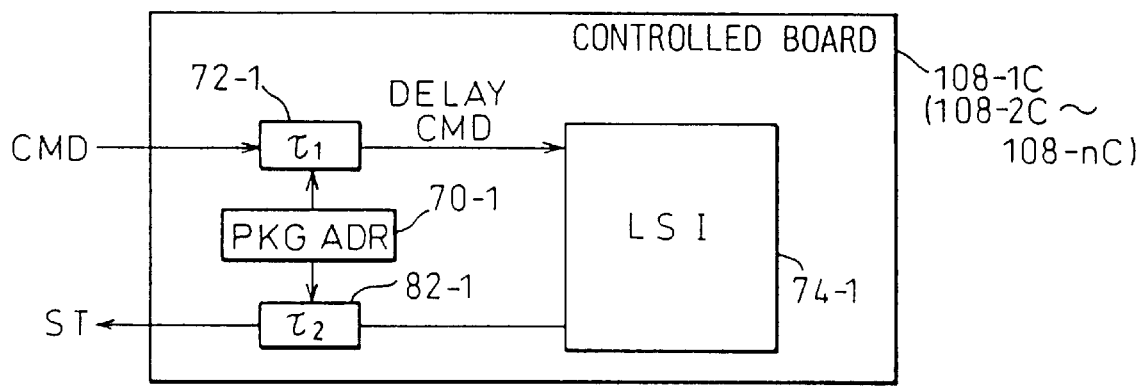
FIG. 15 shows still another embodiment of the present invention.

FIG. 15 shows still another embodiment of the present invention wherein the delay is applied to the status information ST. In this embodiment of FIG. 15, the delay is applied to the information collecting command CMD and the status information ST.

In FIG. 15, PKGADR 70-1 shows the package address register as well as that of FIGS. 13 and 14, and reference numbers 72-1 and 82-1 denote the delay circuits. The delay times $\tau_1$ and $\tau_2$ are the same delay times as shown in FIGS. 13 and 14. The package address register 70-1 and the delay circuits 72-1, 82-1 are provided in the controlled board 108-1C. Other package address registers and delay circuits, which are provided in the controlled boards 108-2C to 108-nC, are not shown in this drawing.

In FIG. 13 to 15, the controlled boards 108-1A, 108-2A, . . . , 108-nA; 108-1B, 108-2B, . . . , 108-nB; and 108-1C, 108-2C, . . . , 108-nC correspond to the controlled unit 2 of FIG. 6. The CPU board 102 corresponds to the control unit 4 of FIG. 6, and the communication LSIs 74-1, 74-2, . . . , 74-n correspond to the internal circuit 16 of FIG. 6. Further, the delay circuits 72-1 to 72-n correspond to the delay circuit 18 of FIG. 6, and the delay circuits 80-1 to 80-n correspond to the delay circuit 20 of FIG. 6.

FIG. 16 shows a signal timing chart for the embodiments of FIGS. 13, 14 and 15. As explained in FIG. 13, CMD shows the information collecting command from the control unit, the first ST shows the status information at the register PKGADR-1, the second ST shows the status information at the register PKGADR-2, and the third ST shows the status information at the register PKGADR-3. In this example, the total polling time Ta becomes Ta×2 since each status information ST is returned to the control unit at the delay time Ta/2.

Figure 17:
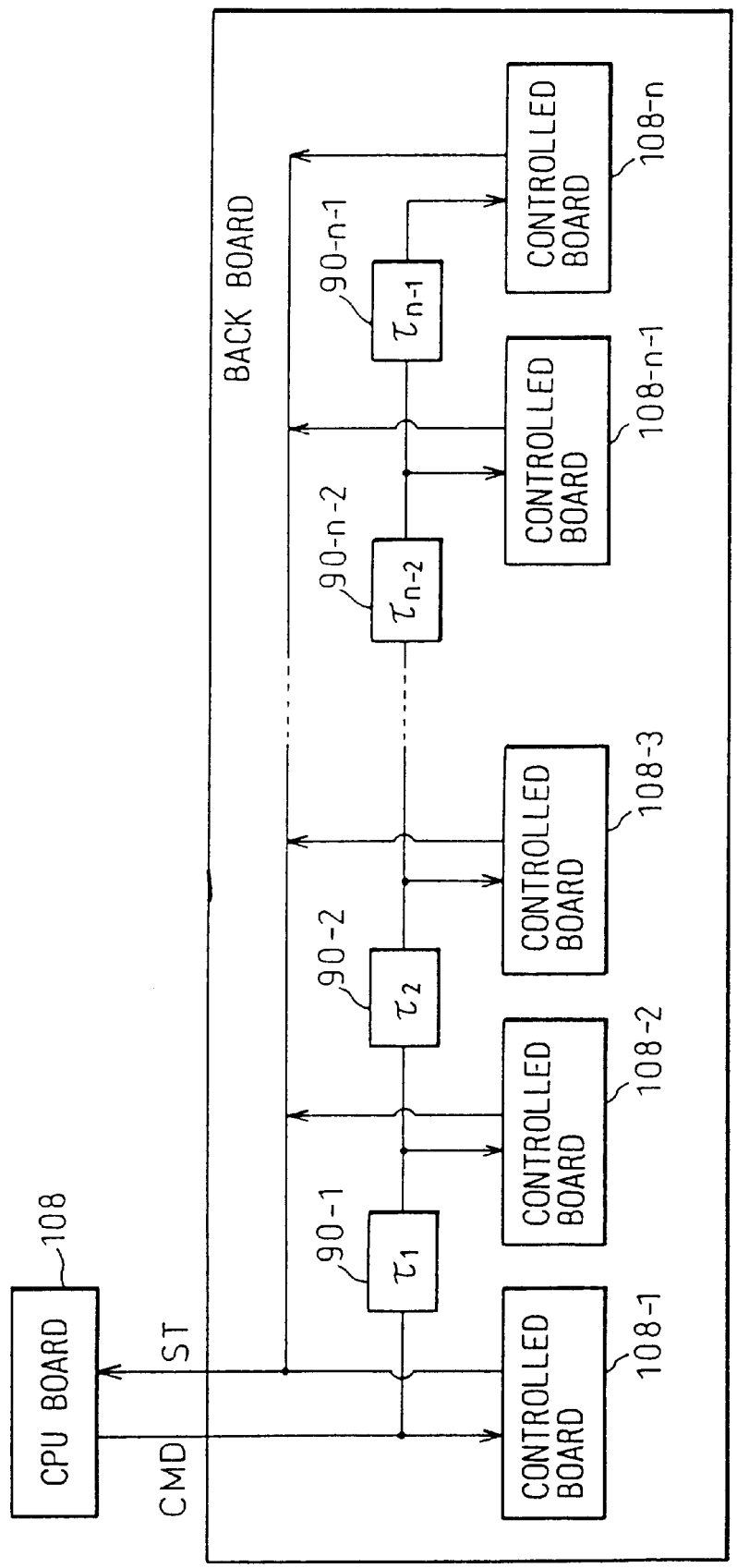
FIG. 17 shows still another embodiment of the present invention.

FIG. 17 shows still another embodiment of the present invention wherein the information collecting command CMD from the CPU board 102 is sequentially applied to each of controlled boards 108-2 to 108-n through each of delay circuits 90-1 to 90-n-1 after the same delay time $\tau$.

That is, first, the command CMD is applied to the controlled board 108-2 through the delay circuit 90-1 after the delay time $\tau_1$, second, the command CMD delayed by the delay circuit 90-1 is applied to the controlled board 108-3 through the delay circuit 90-2 after the delay time $\tau_2$, and finally, the command CMD delayed by the delay circuit 90-n-2 is applied to the controlled board 108-n through the delay circuit 90-n-1 after the delay time $\tau_{n-1}$.

In this case, each delay time $\tau_1, \tau_2, \ldots, \tau_{n-1}$, is given by the same delay time $\tau=(\frac{1}{2})$Ta. As mentioned above, "Ta" is the time from when the information collecting command CMD is transmitted from the CPU board 102 until the status information ST is returned to the CPU board 102 in the normal state. As is obvious from the drawing, the command CMD is directly applied to the first controlled board 108-1 and does not pass through a delay circuit.

Figure 18:
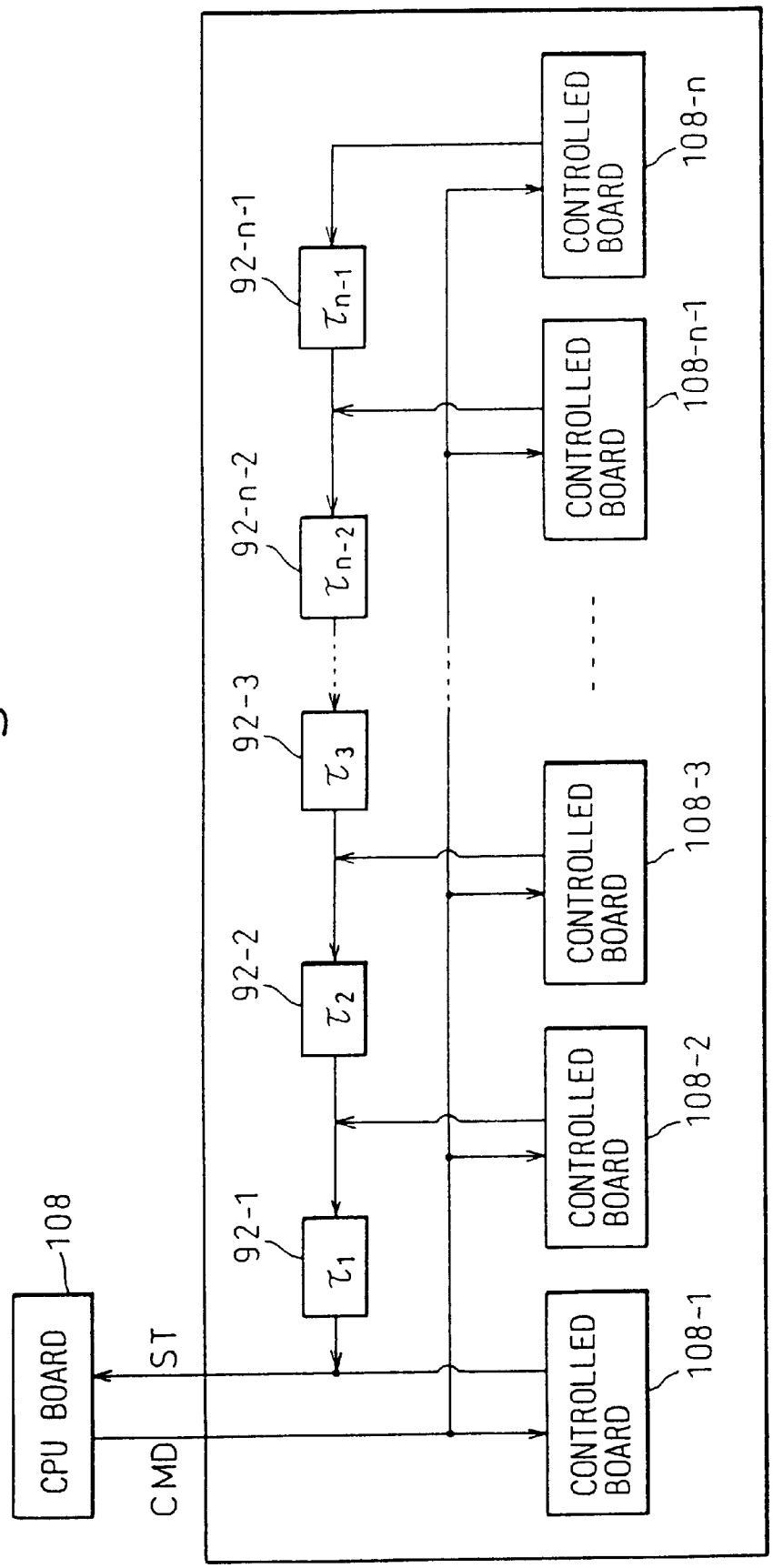
FIG. 18 shows still another embodiment of the present invention.

FIG. 18 shows still another embodiment of the present invention wherein the status information ST from each of controlled board 108-n to 108-2 is sequentially applied to the CPU board 108 through each delay circuit to 92-n-1 to 92-1 after the same delay time $\tau$.

That is, first, the status information ST is applied to the CPU board 108 through the delay circuit 92-1 after the delay time $\tau_1$, second, the status information ST delayed by the delay circuits 92-1 and 92-2 is applied to the CPU board 108 after the delay time $\tau_1$ and $\tau_2$, and finally, the status information ST delayed by the delay circuits 92-1 to 92-n-1 is applied to the CPU board 108 through the delay circuits 92-1 to 92-n-1.

In this case, each delay time $\tau_1, \tau_2, \ldots, \tau_{n-1}$ is given by the same delay time $\tau=(\frac{1}{2})$Ta. As mentioned above, "Ta" is the time from when the information collecting command CMD is transmitted from the CPU board 102 until the status information ST is returned to the CPU board 102 in the normal state. As is obvious from the drawing, the status information ST from the controlled unit 108-1 is directly applied to the CPU board 108 and does not pass through the delay circuit.

The effect of this embodiment is the same as that of FIG. 17. In FIGS. 17 and 18, the controlled boards 108-1 to 108-n correspond to the controlled unit 2 of FIG. 7, and the CPU 102 corresponds to the control unit 4 of FIG. 7. The delay circuits 90-1 to 90-n-1 and 92-n-1 to 92-1 correspond to the delay circuit 22 of FIG. 7.

In above each embodiment, although the explanations were given by using the transmission apparatus, it is possible to realize another apparatus which collects the status information from a plurality of controlled units in response to an information collecting command from a control unit.

I claim:

1. A polling apparatus for polling from a control unit to a plurality of controlled units using an information collecting command in order to collect status information from each controlled unit in a digital processing system, the apparatus comprising:

a detecting means connected to the controlled unit for detecting whether any one of controlled unit is not mounted or has failed, and outputted a selecting signal in order to select response data from a storage means when any one of controlled units 2 is not mounted or has failed;

the storage means for storing the response data which is output therefrom in the abnormal state; and a selecting means connected to the storage means and the controlled unit for selectively outputting either the status information or the response data to the control unit in response to the selecting signal from the detecting means;

wherein the detecting means continuously monitors the status of the controlled units and generates the selecting signal indicating the status of the controlled units in order to reduce a polling time.

2. A polling apparatus as claimed in claim 1, further comprising a connecting means which is provided between an information collecting command pin 11 and a status information pin 13 which are provided on a back plane to which the controlled unit is mounted, and these pins being shorted by the connecting means.

3. A polling apparatus for polling from a control unit to a plurality of controlled units using an information collecting command in order to collect status information from each controlled unit in a digital processing system, the apparatus comprising:

a detecting means connected to the controlled unit for detecting whether any one of controlled units is not mounted or has failed, and outputting a selecting signal; and a selecting means connected to the control unit and the controlled unit for outputting either the information collecting command or the status information to the control unit in response to the selecting signal from the detecting means, and the information collecting command being returned to the control unit through the selecting means, instead of the status information, in the abnormal state, wherein the detecting means continuously monitors the status of the controlled units and generates the selecting signal indicating the status of the controlled units in order to reduce a polling time.

4. A polling apparatus for polling from a control unit to a plurality of controlled units using an information collecting command in order to collect status information from each controlled unit in a digital processing system, the apparatus comprising;

first and second delay circuits and an internal circuit, provided in each controlled unit;

the first delay circuit being connected between an input terminal for receiving the information collecting command and an input terminal for receiving the delayed information collecting command in the internal circuit;

the second delay circuit being connected between an output terminal for outputting the status information from the internal circuit and an output terminal for outputting the delayed status information;

wherein each amount of delay in the first and second delay circuits is set to a value so as not to cause competition between status information in the control unit; and detecting means for continuously monitoring status of the controlled units and generating a selecting signal indicating the status of the controlled units in order to reduce a polling time.

5. A polling apparatus as claimed in claim 4, wherein the amount of delay in each of the first and second circuits is sequentially set to the longer time corresponding proper fraction larger than a half of polling time, i.e., the time taken when the status information is returned to the control unit in response to the information collecting command in normal polling.

6. A polling apparatus for polling from a control unit to a plurality of controlled units using an information collecting command in order to collect status information from each controlled unit in a digital processing system, the apparatus comprising;

a plurality of delay circuits each having the same amount of delay and connected in series, and each controlled unit being connected between adjacent delay circuits except for the first controlled unit, and the sum of the amount of delay from the control unit to a predetermined controlled unit being set to a value so as not to cause competition between status information in the control unit; and detecting means for continuously monitoring status of the controlled units and generating a selecting signal indicating the status of the controlled units in order to reduce a polling time.

7. A polling apparatus as claimed in claim 6, wherein the amount of delay in delay circuits is set to the longer time corresponding to the proper fraction larger than a half of the polling time when the status information is returned to the control unit in response to the information collecting command.

* * * * *